(12) United States Patent
Wettlaufer et al.

(10) Patent No.: US 10,958,125 B2
(45) Date of Patent: Mar. 23, 2021

(54) NON-DRIVE END SHIELD WITH A CIRCUIT BOARD WITH CENTRAL REGION AND BENT TOOTH REGIONS

(71) Applicant: Lenze Drives GmbH, Extertal (DE)

(72) Inventors: Jan Wettlaufer, Hameln (DE); Karsten Huebner, Aerzen (DE); Martin Ehlich, Kalletal (DE)

(73) Assignee: Lenze Drives GmbH, Extertal (DE)

( * ) Notice: Subject to any disclaimer, the term of this patent is extended or adjusted under 35 U.S.C. 154(b) by 192 days.

(21) Appl. No.: 15/768,416

(22) PCT Filed: Oct. 11, 2016

(86) PCT No.: PCT/EP2016/074377
§ 371 (c)(1),
(2) Date: Apr. 13, 2018

(87) PCT Pub. No.: WO2017/064080
PCT Pub. Date: Apr. 20, 2017

(65) Prior Publication Data
US 2018/0301959 A1    Oct. 18, 2018

(30) Foreign Application Priority Data
Oct. 13, 2015   (DE) .................... 10 2015 219 867.7

(51) Int. Cl.
*H02K 5/22*       (2006.01)
*H02K 11/33*      (2016.01)
(Continued)

(52) U.S. Cl.
CPC ............... *H02K 5/225* (2013.01); *H02K 1/14* (2013.01); *H02K 1/185* (2013.01); *H02K 5/10* (2013.01);
(Continued)

(58) Field of Classification Search
CPC ...... H02K 11/01; H02K 11/02; H02K 11/022; H02K 11/024; H02K 11/026; H02K 11/33;
(Continued)

(56) References Cited

U.S. PATENT DOCUMENTS 5,130,882 A * 7/1992 Hilland .................. H02H 9/044
                                                        361/111
6,078,117 A * 6/2000 Perrin .................. H01R 13/719
                                                        310/68 R
(Continued)

FOREIGN PATENT DOCUMENTS

CN          1778029 A      5/2006
CN        102804559 A     11/2012
(Continued)

OTHER PUBLICATIONS

DE-102016107580-A1 English Translation.*
(Continued)

*Primary Examiner* — Maged M Almawri
(74) *Attorney, Agent, or Firm* — Crowell & Moring LLP (57) ABSTRACT

A circuit board to be mounted in a non-drive end shield of an electric motor has a converter formed on the circuit board. The circuit board is divided into a central region and a number of toothed regions surrounding the central region, wherein planes of the toothed regions are bent with respect to a plane of the central region in a mounting position.

10 Claims, 10 Drawing Sheets

(51) Int. Cl.
*H02K 1/14* (2006.01)
*H02K 11/00* (2016.01)
*H02K 1/18* (2006.01)
*H02K 5/10* (2006.01)
*H02K 5/18* (2006.01)

(52) U.S. Cl.
CPC ............ *H02K 5/18* (2013.01); *H02K 11/0094* (2013.01); *H02K 11/33* (2016.01); *H02K 2211/03* (2013.01)

(58) Field of Classification Search
CPC ........ H02K 11/0094; H02K 5/10; H02K 5/18; H02K 5/225; H02K 2211/03; H02K 1/14; H02K 1/185; H05K 1/023; H05K 1/0231; H05K 1/0233; H05K 1/0216; H05K 1/0257; H05K 1/028; H05K 2201/0707; H05K 2201/0715; H05K 2201/0723; H05K 7/2089
See application file for complete search history.

(56) References Cited

U.S. PATENT DOCUMENTS

| | | | |
|---|---|---|---|
| 7,462,965 | B2 | 12/2008 | Natsuhara et al. |
| 8,338,998 | B2* | 12/2012 | Yamasaki ............... H01L 23/36 310/64 |
| 2002/0163263 | A1* | 11/2002 | Uffelman ............... F04B 17/03 310/71 |
| 2004/0090130 | A1* | 5/2004 | Kaneko ................. H02K 11/33 310/58 |
| 2009/0120712 | A1* | 5/2009 | Kashimoto .......... B62D 5/0406 180/444 |
| 2011/0018374 | A1 | 1/2011 | Yamasaki et al. |
| 2012/0098366 | A1 | 4/2012 | Yamasaki et al. |
| 2014/0021833 | A1 | 1/2014 | Nakai et al. |
| 2014/0319941 | A1* | 10/2014 | Clerc ................... H02K 11/024 310/71 |
| 2015/0029672 | A1* | 1/2015 | Nakayama ............ H02M 7/003 361/715 |
| 2015/0292511 | A1 | 10/2015 | Sakai |
| 2016/0105082 | A1* | 4/2016 | Bradfield ........... H05K 7/20918 310/54 |
| 2017/0104395 | A1* | 4/2017 | Tamura .................. H02K 5/145 |
| 2017/0117770 | A1* | 4/2017 | Wu .......................... H02K 5/10 |

FOREIGN PATENT DOCUMENTS

| | | | |
|---|---|---|---|
| CN | 103545989 A | 1/2014 | |
| CN | 103797899 A | 5/2014 | |
| CN | 104782041 A | 7/2015 | |
| DE | 198 52 251 C1 | 3/2000 | |
| DE | 199 49 914 A1 | 10/2000 | |
| DE | 10 2004 031 399 A1 | 2/2006 | |
| DE | 10 2005 032 964 A1 | 1/2007 | |
| DE | 10 2010 017 519 A1 | 1/2011 | |
| DE | 10 2010 038 991 A1 | 2/2012 | |
| DE | 102016107580 A1 * | 10/2016 | ............ H02K 11/33 |
| EP | 0 766 366 A1 | 4/1997 | |
| EP | 1 271 749 A1 | 1/2003 | |
| EP | 2 629 404 A1 | 8/2013 | |
| JP | 60-141147 A | 12/1983 | |
| JP | 2013-233036 A | 11/2013 | |
| WO | WO 2014/124975 A2 | 8/2014 | |

OTHER PUBLICATIONS

English translation of Chinese Office Action issued in counterpart Chinese Application No. 201680073174.8 dated Aug. 27, 2019 (15 pages).
Chinese-language Office Action issued in Chinese Application No. 201680073174.8 dated Apr. 3, 2020 with English translation (14 pages).
International Search Report (PCT/ISA/210) issued in International Application No. PCT/EP2016/074377 dated Jan. 9, 2017.
Japanese-language Written Opinion (PCT/ISA/237) issued in International Application No. PCT/EP2016/074377 dated Jan. 9, 2017.
Hofmann et al., "Modular Inverter Power Electronic for Intelligent E-drives," Electric Drives Productions Conference (EDPC), 2012, $2^{ND}$ International, IEEE, Oct. 15, 2012, pp. 1-6, XP032322629.
Jong et al., "Design Techniques for Thermal Management in Switch Mode Converters," IEEE Transactions on Industry Applications, IEEE Service Center, Piscataway, NJ, US, vol. 42, No. 6, pp. 1375-1386, XP011150197.

* cited by examiner

NON-DRIVE END SHIELD WITH A CIRCUIT BOARD WITH CENTRAL REGION AND BENT TOOTH REGIONS

BACKGROUND AND SUMMARY OF THE INVENTION

The invention relates to a circuit board which is designed to be installed in a non-drive end shield of an electric motor. The invention also relates to a non-drive end shield for an electric motor. Furthermore, the invention relates to a motor kit and to an electronic motor.

Electric motors are used nowadays for a large number of tasks. In particular, highly integrated drives can be used in which, for example, the motor and the power electronics can be integrated into one housing. Such electric motors are also referred to as electronic motors.

In the electronic motors which are known from the prior art it has become apparent that there are a series of problems which are mentioned below.

Integration concepts in the smart stator tooth (SST) design require plug-type connectors between the power modules and their central circuit board which are susceptible to interference.

It has previously not been possible to construct an electric motor which can be equipped with two different non-drive end shields, so that the latter can either be fabricated as a motor without power electronics or as a highly integrated drive (electronic motor). The difference between a motor and a highly integrated drive is therefore clearly apparent to the customer. This is because of the visible electronics which give an unreliable impression, therefore giving rise to reduced acceptance of electronic motors in the market.

Many components of existing highly integrated drives cannot be fabricated automatically on existing fabrication systems such as, for example, automatic placement machines. This increases the fabrication costs.

Existing highly integrated drives are typically composed of a very large number of individual components. Several of these components are special parts such as, for example, a central ring capacitor which has a busbar and which does not constitute a standard component which is easy to acquire.

The previously available integration concepts do not make ideal use of the installation space which is available in the non-drive end shield, as a result of which the drives are larger than is actually necessary. This is disadvantageous, since in almost all applications drives with a high power density and torque density can be integrated better.

Previous integration concepts require a plurality of components which can be manufactured only by means of 3D CNC milling. Series production on 5-axis CNC processing centers and the associated series quality control on coordinate measuring probes are, however, extensive and therefore expensive.

In order to avoid EMC problems, power modules have to be connected with low impedance to the intermediate circuit capacitor, which can be implemented only when there is a short spatial distance. In previous integration concepts, this was achieved with a ring capacitor. However, this is extensive to fabricate and to mount, since each power module has to be connected to said ring capacitor individually with two attachment elements such as, for example, screws.

It is not possible to pot the electronics in previous integration concepts, since they are not located in an enclosed installation space. As a result, in order to attain the necessary protection class it is necessary to use sealing elements which are separate, expensive and ultimately susceptible to interference.

An object of the invention is therefore to provide measures which solve, in particular, one or more of the problems described above.

This is achieved according to the invention by means of a circuit board, a non-drive end shield, a motor kit and an electric motor in accordance with embodiments of the invention.

The invention relates to a circuit board to be installed in a non-drive end shield of an electric motor. A converter is formed or arranged on the circuit board. The converter can have, for example, a half bridge or a full bridge. Furthermore, the circuit board is divided into a central region and a number of toothed regions surrounding the central region, wherein planes of the toothed regions are bent with respect to a plane of the central region in a mounting position.

A converter can be integrated into a non-drive end shield of an electric motor by means of such a circuit board, as a result of which at least some of the further problems described above can be solved. It is possible to provide a plurality of converters on the circuit board, which together form a multi-phase converter.

The central region can be, in particular, a central circuit board. Likewise, the toothed regions can be respective toothed circuit boards. A circuit board can be understood here to be, in particular, a structure with a carrier material and mounted conductor tracks and construction elements.

According to one advantageous embodiment, in the mounting position the planes of the toothed regions can each be bent in a fixed fashion transversely with respect to the plane of the central region. This can be achieved, for example, by means of a header on the central region onto which header the toothed regions or a respective toothed region are/is plugged. A connection which is fixed, in particular with respect to the orientation, can, however, also be brought about, for example, by soldering "circuit board to circuit board", that is to say by means of a fixed soldered connection of two circuit boards to one another.

As an alternative to this, according to an embodiment which is also advantageous the circuit board can have bending points between the central region and the respective toothed regions, wherein a respective toothed region can be moved, by means of the respective bending point, between an extended state in which the plane of the respective toothed region is parallel to the plane of the central region, and a bent state in which the plane of the respective toothed region is positioned transversely with respect to the plane of the central region.

This permits variability with respect to the orientation of the toothed regions in relation to the central region, wherein, for example, advantageous fabrication methods can be implemented. In particular it is possible to leave the toothed regions and central region parallel for the fabrication, in order to be able to process or equip them together like a single circuit board. When the circuit board is placed into the non-drive end shield, the toothed regions can then advantageously fold over, wherein typically it is possible to dispense with separate triggering of the folding over, since typical non-drive end shields are embodied in such a way that the toothed regions fold over automatically when the circuit board is placed into the non-drive end shield.

An intermediate circuit capacitor and/or a power module can preferably be arranged on a respective toothed region. Intermediate circuit capacitor and power module are preferably arranged at the same position here on opposite sides of the respective toothed region. This permits particularly advantageous proximity of the intermediate circuit capacitor and power module, with the result that the area spanned by the commutation cell can be minimized. Furthermore, particularly advantageous dissipation of heat is possible if the power module is mounted directly onto the non-drive end shield.

It will be understood that gate drivers can also be arranged on the toothed regions, which also leads, in particular, to advantageously short lines.

Furthermore, the invention relates to a non-drive end shield for an electric motor, wherein a circuit board on which a converter is formed is integrated into the non-drive end shield. In this context, in particular the existing installation space can be advantageously utilized. The circuit board of the non-drive end shield can be, in particular, a circuit board according to the invention. In this context, it is possible to have recourse to all the described embodiments and variants. Explained advantages apply correspondingly.

The non-drive end shield can have, in particular, a housing which constitutes a housing of the circuit board. Therefore, a housing can have two functions, specifically as a housing of the non-drive end shield and as a housing of the circuit board. In particular, the housing can constitute for both the entire electric motor and also specifically for the circuit board an enclosure corresponding to the respectively desired protection class, for example with respect to protection against liquid or protection against dust.

The non-drive end shield can be composed of two individual parts, wherein one of the individual parts can be embodied in a rotationally symmetrical fashion (for example as a rotary part), and the other of the individual parts can be embodied as an extruded part.

The housing can have, in particular, a number of inwardly directed cooling fins. Advantageous dissipation of heat from the circuit board can be achieved this way. For this purpose, the cooling fins can be advantageously directed onto the circuit board. As a result of the inward orientation, said cooling fins cannot be seen from the outside, with the result that a motor without a circuit board cannot be differentiated from one with a circuit board.

The circuit board can advantageously be attached to the housing by means of a number of attachment elements, in particular screws, self-locking clamping elements and/or attachment brackets made of spring steel. This permits simple and reliable attachment of the circuit board, with the result that, in particular, advantageous transportation of heat is also possible.

The toothed regions of the circuit board can be attached here in a heat-conducting fashion in the housing by means of a respective attachment element. For example, heat-conducting pastes or other heat-conducting elements can be used for this purpose. Therefore, heat which arises, in particular, when intermediate circuit capacitors or power modules are mounted on the toothed regions, can advantageously be discharged to the housing and therefore to the surroundings.

The housing advantageously has a number of feedthroughs for coil wires which can be, in particular, of an electrically insulating design. Each feedthrough is advantageously led from one side of the housing, which faces stator coils of the electric motor, to an associated electrical connecting point, for example in the form of a soldering point or insulation piercing connection, on the circuit board. This relates, in particular, to the mounting situation. The feedthroughs are advantageously each embodied in such a way that they taper conically toward the connecting point. The stator coils are preferably embodied using toothed coil technology, wherein a respective toothed region can be functionally assigned to a respective toothed coil.

The connecting points are preferably accessible from above. They can be embodied, for example, as a solder point, insulation piercing terminal, spring force terminal or screw terminal.

Particularly simple manufacture can be achieved by means of such feedthroughs, wherein the coil wires can be oriented, and then the non-drive end shield can be fitted on the rest of the electric motor in such a way that the coil wires are received in the respective openings. Undesired uncontrolled bending of the coil wires is prevented by means of the conical profile. The coil wires then advantageously exit the openings at precisely the location of the circuit board at which they are to be attached to the circuit board or soldered thereto.

The housing can be filled, in particular, with a sealing compound which encloses the circuit board. Advantageous protection of the circuit board against influences such as, for example, dust, moisture or mechanical damage, can therefore be achieved. Furthermore, given the corresponding selection of the sealing compound, for example as a heat-conducting sealing compound, advantageous discharging of heat can be achieved.

The invention furthermore relates to a motor kit. The motor kit has an electric motor housing. Furthermore it has a first non-drive end shield which is embodied according to a non-drive end shield according to the invention. In this context, it is possible to have recourse to all the described designs and variants. The motor kit also has a second non-drive end shield which does not have a circuit board, or does not have a circuit board with a converter.

Both the first non-drive end shield and the second non-drive end shield can be combined with the electric motor housing to form an electric motor in such a way that an electric motor with the first non-drive end shield is, from the outside, visually similar or identical to an electric motor with the second non-drive end shield.

The motor kit according to the invention permits an electric motor to be manufactured both as a motor without power electronics and as an electronic motor, wherein the two different designs cannot be differentiated visually from one another. Therefore, the functionality of an electronic motor can be provided without the impression of a lack of reliability being given to technically inexperienced viewers by visible exposed electronics.

The invention furthermore relates to an electric motor which has an electric motor housing and a non-drive end shield according to the invention which is connected thereto. In this context, it is possible to have recourse to all the described variants and embodiments.

By means of the electric motor according to the invention, the advantages of a non-drive end shield, described further-above and at other locations in this application, for an electric motor can be made usable. In particular, the electric motor housing can include other components such as coils, in particular using toothed coil technology, or a rotor which are preferably embodied in such a way that a functionally capable electric motor is produced by combining the non-drive end shield and the electric motor. However, further components such as, for example, a drive end shield or a fan unit can also be mounted for this purpose.

The electric motor can have, in particular, a number of stator coils, in particular using toothed coil technology, with respective coil wires, wherein the coil wires are led through respective feedthroughs of the non-drive end shield to corresponding electrical connecting points on the circuit board. This permits an arrangement, which saves much more on space, of the coil wires and simple manufacture. Details are given below on a number of specific advantages of the solution according to the invention and/or described embodiments.

In comparison with the prior art, plug-type connections can be dispensed with, since the converter which is presented here is a single-circuit board device. This can be achieved, in particular, in that instead of plug-type connectors, flexible intermediate pieces are integrated as "rigid-flex circuit boards" in the main circuit board. Said intermediate pieces do not have to be plugged in. Additional circuit board area is provided through the toothed regions or toothed circuit boards which can be folded down and which are connected to the central region or to the central circuit board via flexible intermediate pieces. Since the converter can be accommodated completely in an enclosed installation space such as the non-drive end shield, it can be composed of just one circuit board and does not have to be plugged together for mounting on the motor, as is the case with previous concepts. Large components, for example intermediate circuit capacitors, can be mounted on a respective toothed region or a toothed circuit board, as a result of which a 2.5D structure with particularly good utilisation of the installation space is obtained.

A non-drive end shield which, as described, simultaneously serves as a housing of the converter, is virtually indistinguishable from the outside from that of the comparable series motor or motor. Instead of the electronics, just one connection ring can also be introduced therein and the electric machines of the highly integrated drive could be sold in an externally identical housing as an electric motor without electronics. This can be achieved, in particular, by virtue of the fact that the housing of the converter serves at the same time as a non-drive end shield of the electric machine, and the housing of the converter contains cooling fins which cannot be seen from the outside, with the result that a flat surface is obtained over the entire drive, and the housing of the converter has the same external dimensions as the housing of the electric machine. A further advantage arises with respect to the automation of a circuit board to be fabricated. The entire converter circuit board can be composed of a plurality of rigid pieces which are connected by means of flexible intermediate pieces, which is also referred to as a rigid-flex circuit board. As a result, they can be automatically equipped in the planar level on existing fabrication systems. The circuit board can be automatically equipped and soldered in two working steps. Firstly, SMD components can be mounted on their underside. Then, wired components such as, for example, capacitors and/or compensation current transformers, can be mounted on their upper side.

The circuit board can easily be mounted in a converter housing. Only after the entire equipping process, when the circuit board is mounted in the housing, are the toothed regions or toothed circuit boards typically folded over rearward. This does not require any particular device, but rather takes place, as it were, automatically by the circuit board being inserted into the housing.

In one alternative implementation possibility without rigid-flex intermediate pieces, the toothed circuit boards are already in the correct position and do not have to be folded over. If the circuit board is positioned in the housing, attachment elements between the central region and the converter housing can be attached. For example screws, self-latching clamping elements or other attachment means can be used for this purpose. For example a "screwing" working step can be eliminated with self-latching clamping elements.

Then, the toothed circuit boards can be secured with plug-on attachment elements. This press fit forms thermally good conductive contact between the housing and the power module.

The machine housing can be easily connected to the converter housing. The machine, i.e. in particular the electric motor, can be pre-mounted on the existing fabrication systems. In this context, in particular a drive end shield and a shaft with a housing and a stator can be mounted. Typically two wires, which are located perpendicularly toward the rear, are provided per toothed coil.

When the non-drive end shield is pressed onto the shaft, each toothed coil wire finds its way to the respective solder point through the conical feedthroughs, introduced in the converter housing, for coil wires. The solder points for the coil wires are preferably accessible from above. The soldered connection can therefore be manufactured automatically. Then, when necessary the converter housing can be filled with sealing compound and a fan unit can be mounted. The entire drive can then be completely mounted.

In the previous designs, typically inlay heat sinks or adapter plates were necessary for the thermal connection of the power semiconductors. In the solution according to the invention these can be dispensed with, since the power semiconductors can now be connected thermally via the non-drive end shield. A ring capacitor can be eliminated since capacitors can be accommodated on the toothed circuit boards or toothed regions. The capacitors which are used are typically standard components which are easier to acquire. Separate toothed circuit boards can also be eliminated, since they can be implemented here as a foldable element of the central circuit board or of the central region.

The effectively usable circuit board area can be significantly increased through the foldable toothed circuit boards and the intermediate circuit capacitors which are mounted thereon. This makes it possible to accommodate all the components of the converter on a circuit board and to dispense with stacking of the circuit boards. The installation space in the non-drive end shield is utilized to an optimum degree by the described 2.5D circuit board design.

With the inventive solution only the converter housing, which is at the same time the non-drive end shield, is typically manufactured as a 3D CNC milled part. The latter can be embodied as a cast part and post-processed in a metal-cutting fashion. As a result of the embodiment of the converter housing as cast part, swarf is no longer produced, and no more effort is required than is the case with a comparable non-drive end shield without an integrated converter. There is therefore a saving in terms of material, time and costs. Inlay heat sinks, adapter plates or housing parts which are milled from a solid piece of material can be eliminated.

An intermediate circuit capacitor can be mounted on the one side of the toothed region which can be considered to be a circuit board element, wherein the power module can be mounted on the other side. As a result, the spatial distance and therefore also the area spanned, which is decisive for the inductance, are minimal. The capacitor which is used and the power module can be mounted and soldered on existing fabrication systems.

The entire electronics can be located in an installation space, specifically the converter housing, which serves at the same time as a non-drive end shield. This installation space can be filled with sealing compound easily and cost-effectively.

In terms of cost aspects it may be sometimes sensible to dispense with rigid-flex circuit boards. There are basically two exemplary possible ways of implementing this.

On the one hand, a header can be soldered onto the toothed regions or onto toothed circuit boards, which are then to be implemented individually. A pattern of holes which corresponds to the header is then provided in the central region or on the central circuit board. The header can be plugged and soldered into the pattern of holes. This also results in a rectangular connection between the two circuit boards. The inverse embodiment is also possible in which the headers can be on the central region, and corresponding patterns of holes can be on the toothed regions.

Furthermore, one edge of the toothed region, which edge is plugged into the central circuit board, can also be embodied with teeth. In the central circuit board or the central region, corresponding right-angled cutouts are advantageously provided. Both circuit boards are plugged into one another at a right angle and soldered. This results in a right-angled connection between the two circuit boards. The inverse embodiment is also possible according to which teeth are arranged on the central circuit board, and right-angled cutouts are arranged on the toothed circuit board.

Therefore, advantages such as, for example, lower material costs for the circuit boards can be achieved. It is possible to fabricate n toothed circuit boards per central circuit board, resulting in relatively high production numbers for them, which can lead to cost savings per circuit board. Furthermore, the area of the central circuit board becomes smaller.

For the electric motor it is possible to select an embodiment without a star point, wherein the power modules can then be embodied as full bridge modules, for example with four insulated gate bipolar transistors (IGBTs) and four diodes. It is possible to select an embodiment with a star point, and the power modules are then embodied as half-bridge modules, for example with two IGBTs and two diodes. The number of the toothed coils can vary, but only one combination of a coil number and rotor pole pair number is typically appropriate.

Gate drivers for the power semiconductors can be positioned on the toothed region or the toothed circuit board, and they are then seated directly above the switching power semiconductor.

One or more of the intermediate circuit capacitors can be positioned on the upper side of the toothed circuit board. These are then also seated directly above the switching power semiconductor. The small commutation circuit which is therefore possible reduces EMC interference and voltage peaks at the switching semiconductor. The installation space which is available in the non-drive end shield is therefore utilized better than if the capacitors were positioned on the central circuit board.

The power module which is used can be soldered, for example, using SMD technology. A capacitor which is used can be embodied using THT technology. The inverse embodiment is also possible. It is therefore possible, for the most part, for automated component placing and soldering to be achieved.

For example a magneto-resistive sensor can be mounted centrally on the underside of the central region. Said sensor then forms, with the magnet mounted at the shaft end, a device for sensing the rotor position. It is then possible to dispense with a rotor position encoder which is embodied separately.

Heat-generating components such as, for example, microcontrollers or FPGAs (field programmable gate arrays) on the central circuit board can be embodied using SMD technology and positioned on the underside of the circuit board. The non-drive end shield then also acts as a heat sink for these components. In particular attachment brackets can be used as attachment elements. Said brackets can advantageously be composed of spring steel. They permit the circuit board to be mounted without a tool in its housing, which simultaneously constitutes the non-drive end shield.

A bullet point enumeration of possible features and/or advantages of the solution according to the invention and its described refinements will be given once more below:

- Increased reliability, particularly in applications in which strong vibrations are to be expected.
- Less effort on mounting since no manual plug-in processes have to be carried out.
- More usable circuit board area through 2.5D design.
- Better utilisation and therefore more available installation space in the non-drive end shield through 2.5D design.
- The circuit board can for the most part be fabricated automatically since plug-type connections are eliminated.
- A separation of motor fabrication and electronics fabrication is advantageous for organizational and technical reasons, and this separation can continue.
- Through the reduction of the number of variants it is possible to achieve higher production numbers.
- A smooth surface cannot become blocked with dirt during operation, as often occurs with cooling fins on the outside.
- Internal cooling fins do not present a risk of injury even at high temperatures.
- Visible electronics which often give rise to doubts regarding reliability for non-specialists are avoided.
- The mounting can be carried out for the most part automatically.
- Reduction of fault possibilities through automated processes.
- Easier production capability through the use of standard components.
- The mounting of the electrical machine remains unchanged by the sequence in the devices used.
- Fewer components are required, which means less effort and fewer costs.
- Relatively high reliability since components which are susceptible to interference are eliminated.
- Standard components are available with continuously high quality from multiple providers, permitting bottlenecks to be avoided.
- A larger usable area on the circuit board allows a stack of a plurality of circuit boards to be dispensed with. This saves costs and increases the reliability because the plug-type connectors between the circuit boards, which are susceptible to interference in the case of vibrations and shaking, are eliminated.
- Savings in terms of materials and fabrication time during series fabrication, since significantly less swarf is produced in the case of cast parts if they are only post-processed than when entire workpieces have to be milled from a solid piece of material.
- Cost savings on quality assurance in series fabrication, since the areas which are manufactured can be checked with simple mechanical measuring means and devices.
- There is no need for more mechanical components, and also no more complicated mechanical components than in contemporary motor housings, as a result of which a similar cost structure of mechanical fabrication can be expected.

Less EMC interference and therefore less cost-intensive interference suppression measures are necessary, since the commutation cell is very small.

Reduced voltage peaks at the switching power semiconductors during the switching processes, and as a result the power semiconductors are not so strongly loaded, as a result of which the reliability increases.

More stable voltage at switching power semiconductors, as a result of which their regulation is simplified and a steeper rise in the coil current is achieved. This gives rise to an increase in drive performance such as dynamics, rigidity and torque ripple.

High protection classes can be achieved without sealing elements.

The electronic components are protected better against vibrations and shocks by potting.

In particular the invention is advantageous for medium-sized motor designs of approximately 5.5 kW to 11 kW, but can also be used for all other motor design sizes.

The invention also relates to a mounting method in which coil wires of the electronic motor are fed independently to the connecting points of the circuit board.

BRIEF DESCRIPTION OF THE DRAWINGS

The invention will be described in more detail below with reference to the drawings, in which.

DETAILED DESCRIPTION OF THE DRAWINGS

Figure 1:
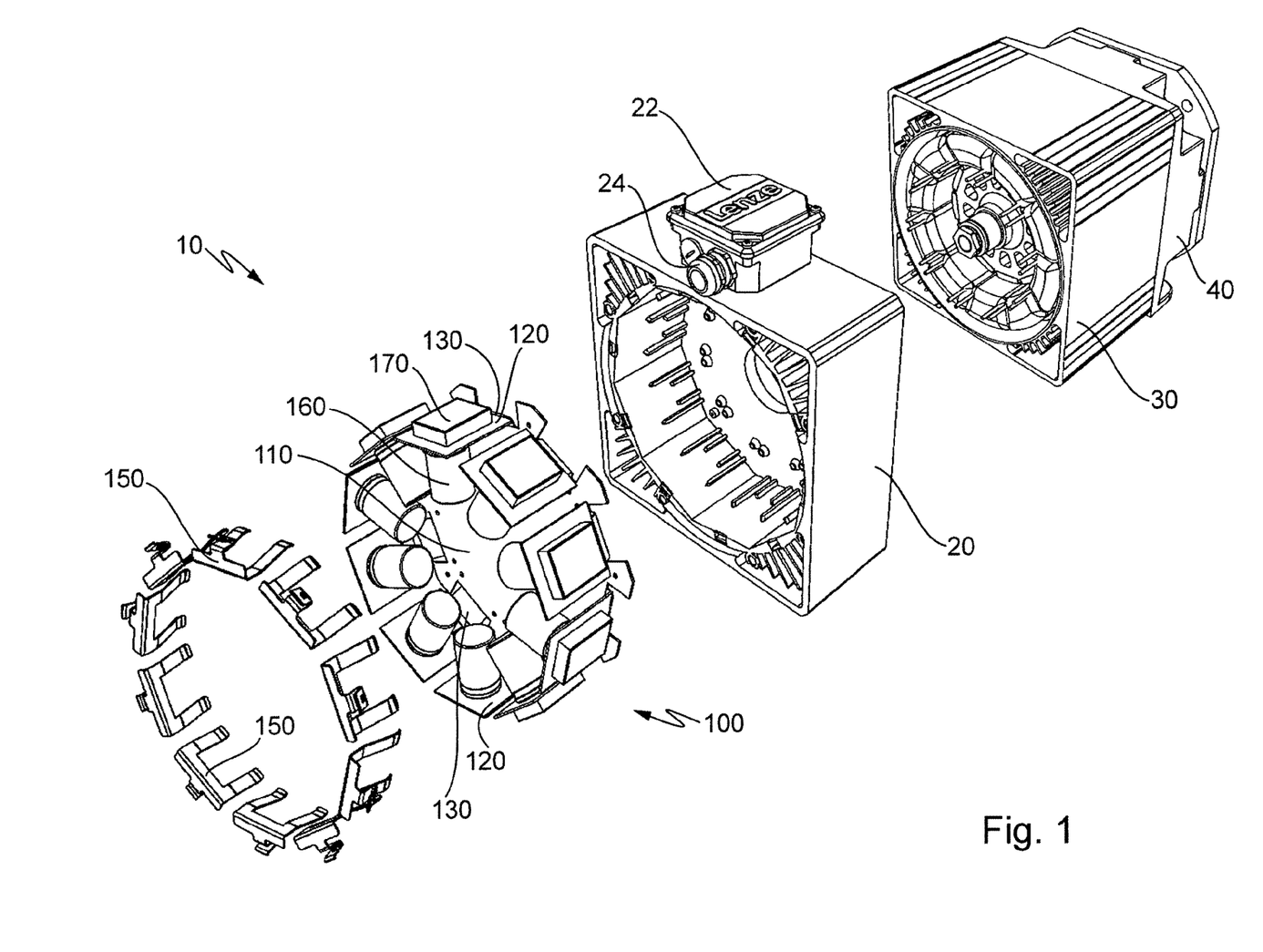
FIG. 1 shows parts of an electronic motor in an exploded view.

FIG. 1 shows parts of an electric motor 10 in an exploded view.

The electric motor 10 has a non-drive end shield 20. A terminal box 22 and a feedthrough 24 which is arranged thereon are arranged on said non-drive end shield 20.

The electric motor 10 also has an electric motor housing 30. Components which are not denoted in more detail, such as coils, are arranged in the housing using toothed coil technology.

In the illustration of FIG. 1, a drive end shield 40 is arranged behind the electric motor housing 30.

A circuit board 100, which is designed to be accommodated in the non-drive end shield 20, is illustrated at the front of FIG. 1.

The circuit board 100 has a central region 110. The latter is embodied, in particular, in a flat and disk-shaped fashion.

A converter, which is not illustrated or described in more detail, is formed in the central region 110. In this respect reference is made to the relevant specialist literature.

A number of ten toothed regions 120 are formed in total lying radially around the central region 110, which toothed regions 120 are located at a respective angle of 90° with respect to the central region 110. It is to be noted that both in this illustration and also in further illustrations not all the toothed regions 120 or the like or components connected thereto are provided with reference symbols but instead in each case only exemplary elements are, in order to avoid unnecessarily complicating the illustration.

A respective bending point 130 is provided between a respective toothed region 120 and the central region 110. At the bending point 130, the respective toothed region 120 can be bent relative to the central region 110, to be precise in particular through an angle of 90°. The respective toothed region 120 can therefore be bent through 90° with respect to the position illustrated in FIG. 1, with the result that the respective toothed region 120 would then lie flat with the central region 110. Such a position permits, in particular, advantageous automatic placing of components.

A capacitor 160 is arranged on the inside of each toothed region 120. A respective power module 170 is arranged on the outside thereof. This permits a very small distance between the capacitor 160 and the power module 170, with the result that an inductance which occurs between them is minimized.

Furthermore, a total of ten attachment elements 150, embodied in the form of clamps, are also shown in FIG. 1. The attachment elements 150 can, as illustrated in the following figures and correspondingly described, be plugged onto the toothed regions 120, in order to secure them in the installed state. More details will be given on this further below.

Figure 2:
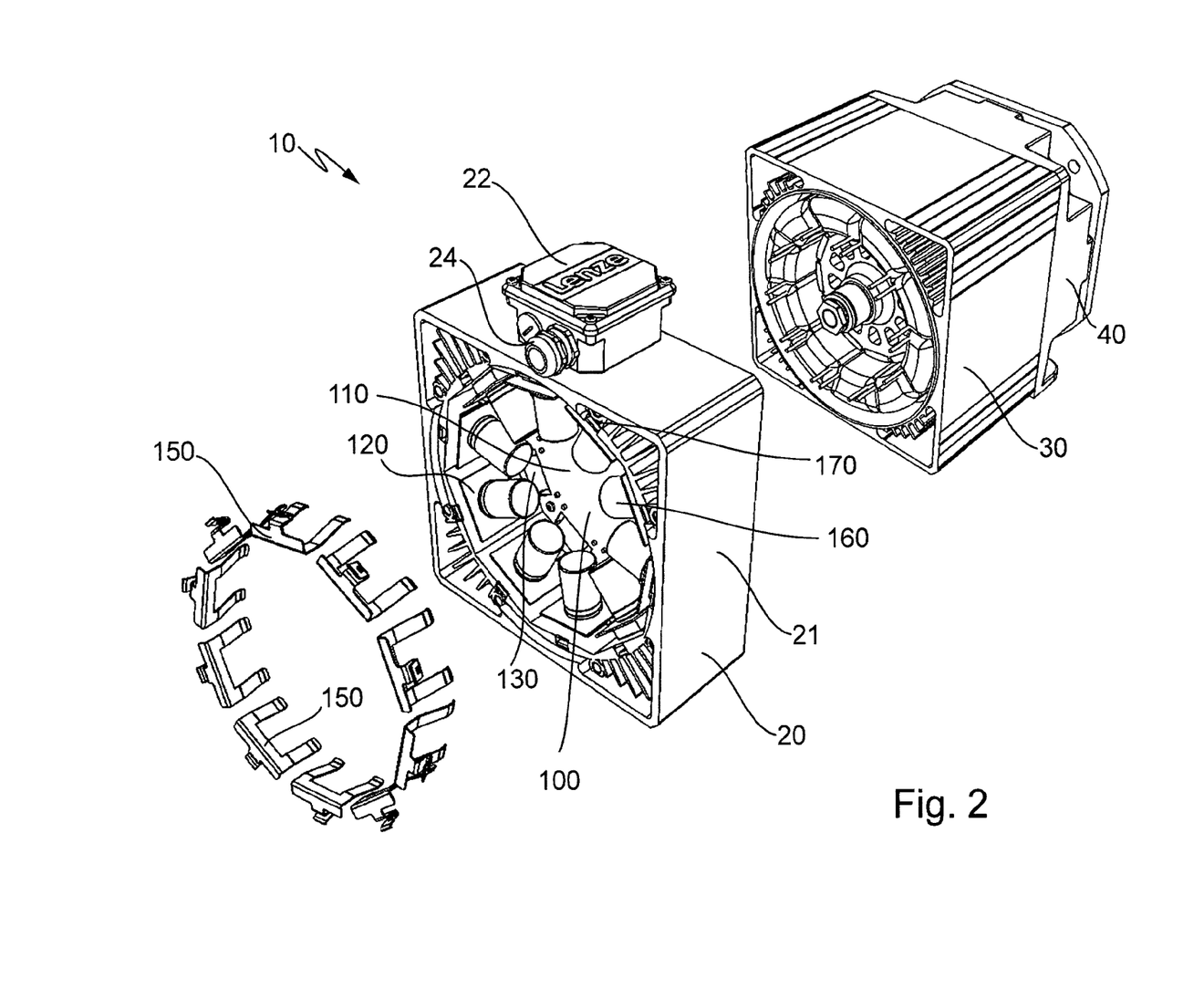
FIG. 2 shows the parts illustrated in FIG. 1 in a partially assembled state.

FIG. 2 shows the electric motor 10 in a further assembled state. In this context, the circuit board 100 is accommodated in the non-drive end shield 20.

The non-drive end shield 20 has a housing 21, which is now also the housing of the circuit board 100. In other words, the housing 21 of the non-drive end shield 20 serves simultaneously also as a housing of the converter. A protection class of the housing 21, in particular in terms of moisture and/or dust, which is typically provided in any case for the electric motor 10, therefore also applies automatically to the converter arranged on the circuit board 100.

Figure 3:
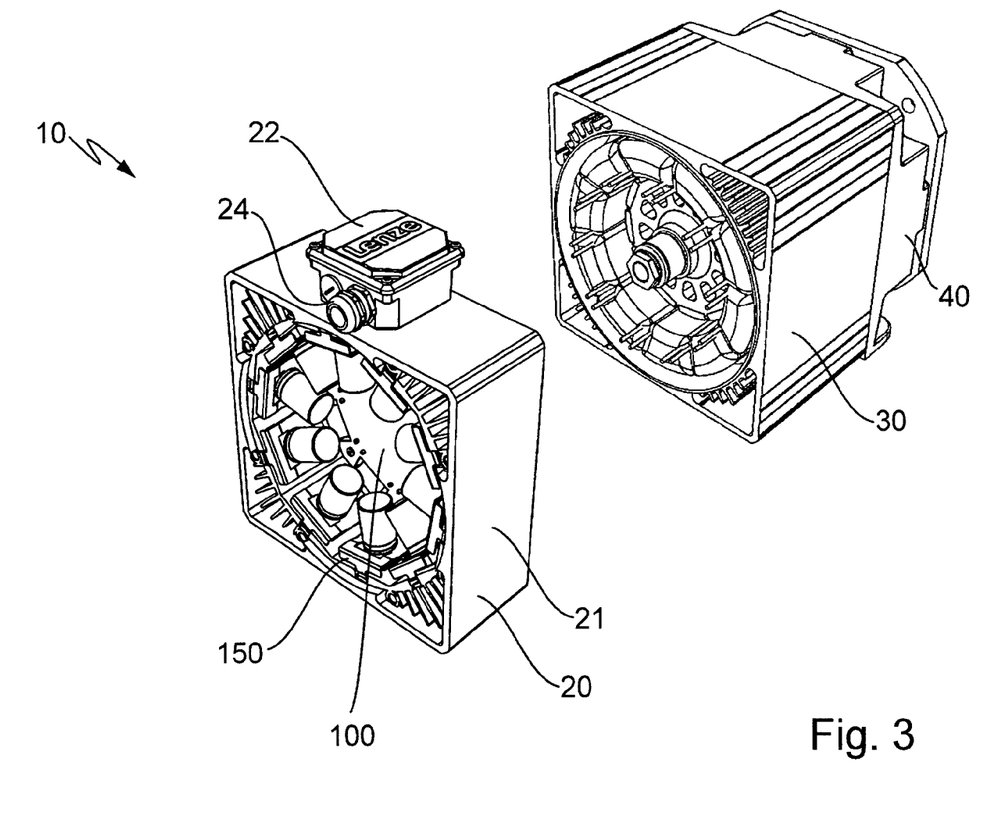
FIG. 3 shows the parts illustrated in FIG. 2 in a partially assembled state.

FIG. 3 shows the electric motor 10 in a state in which it is assembled still further. In this context, the electric motor housing 30 has been attached to the non-drive end shield 20.

Figure 4:
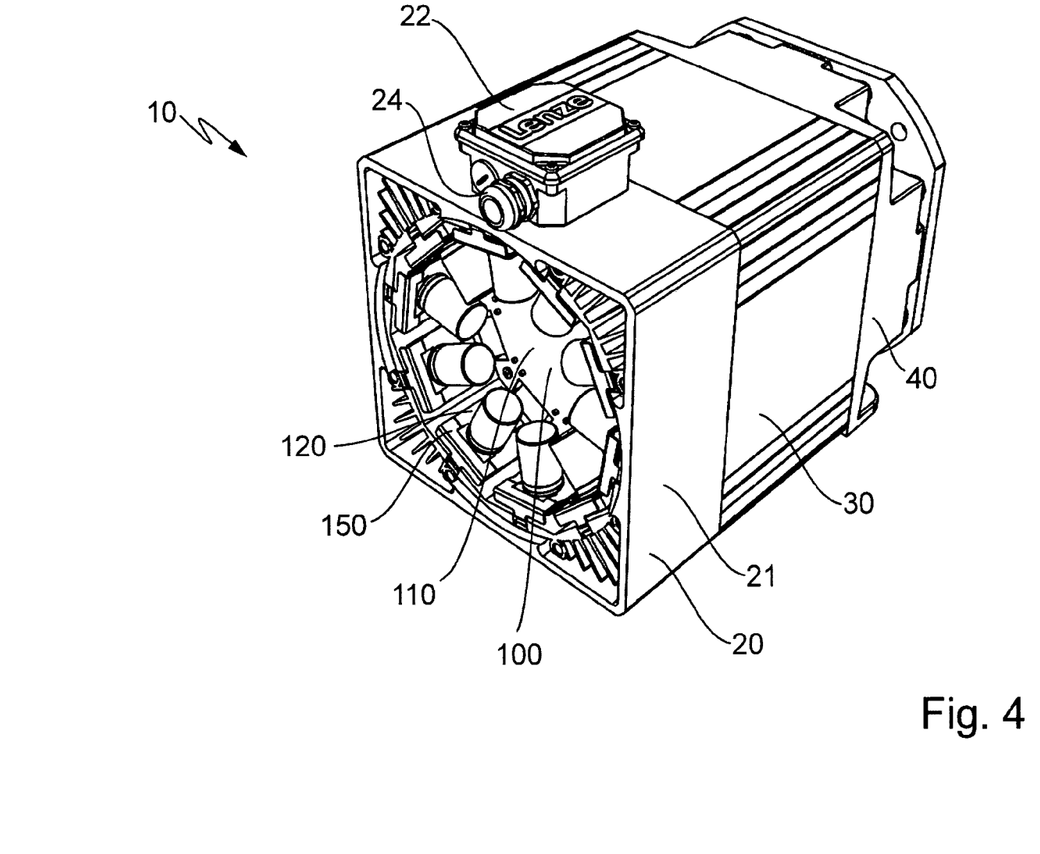
FIG. 4 shows the parts illustrated in FIG. 3 in an assembled state.

FIG. 4 shows the electric motor 10 in a still further assembled state. In this context, the attachment elements 150 have been plugged onto the respective toothed regions 120, with the result that each toothed region 120 is respectively assigned an attachment element 150. The attachment elements 150 ensure that the toothed regions 120 are held in a defined position and orientation relative to the housing 21 of the non-drive end shield 20. This also ensures, in particular, that there is particularly good thermal contact between the respective toothed region 120 and the non-drive end shield 20. Therefore, heat, in particular from the respective power module 170, can advantageously be output directly to the non-drive end shield 20 and be discharged from there to the outside.

Figure 5:
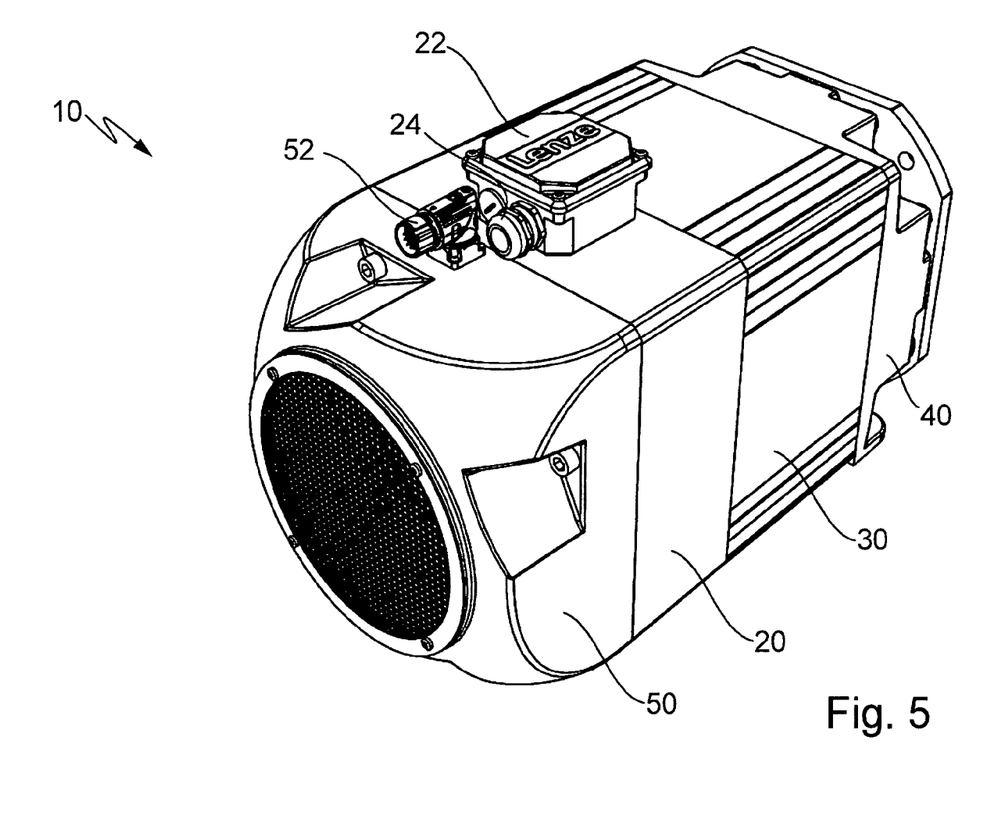
FIG. 5 shows a complete electric motor from the outside.

FIG. 5 shows the electric motor 10 in an assembled state. In addition to the elements which have already been shown and described, the electric motor 10 also has a fan unit 50. A fan, which serves to cool the motor 10, is arranged in the fan unit 50. Furthermore, arranged on the fan unit 50 is a terminal 52 at which communication components such as, for example, a terminal for a CAN bus can be arranged. This permits advantageous integration of the electric motor 10 into a control system, for example of a vehicle or of an aircraft.

Figure 6:
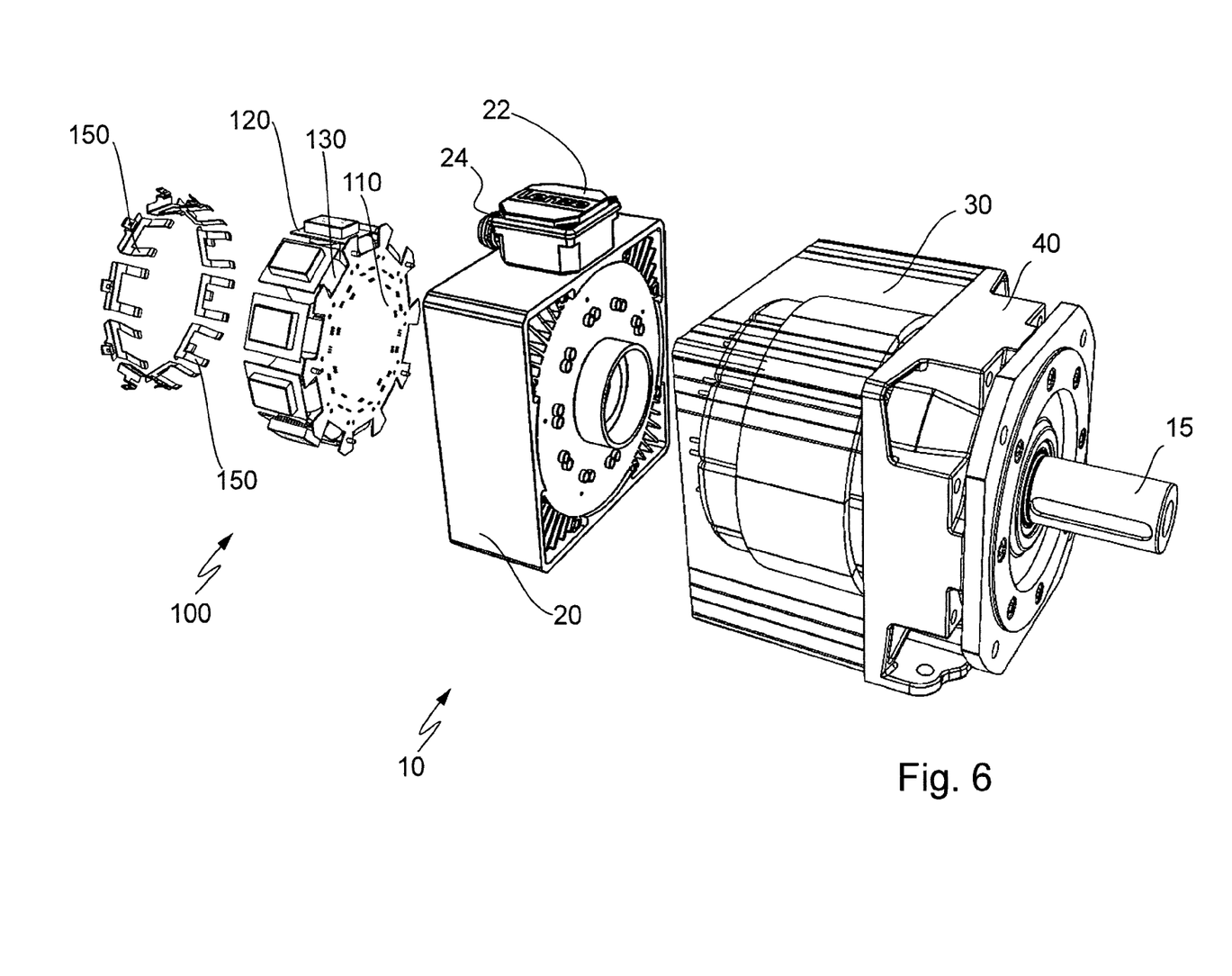
FIG. 6 shows an exploded view of parts of an electric motor from another perspective.

FIG. 6 shows the electric motor 10 in a further exploded view, specifically from a different perspective than in FIG. 1. With respect to the individual components, reference is made to the description of FIG. 1 above and to the other figures. In addition, FIG. 1 shows a shaft 15 which protrudes from the drive end shield 40. This shaft 15 rotates when the electric motor 10 operates and can be used to drive components such as, for example, an air-conditioning system of an aircraft.

Figure 7:
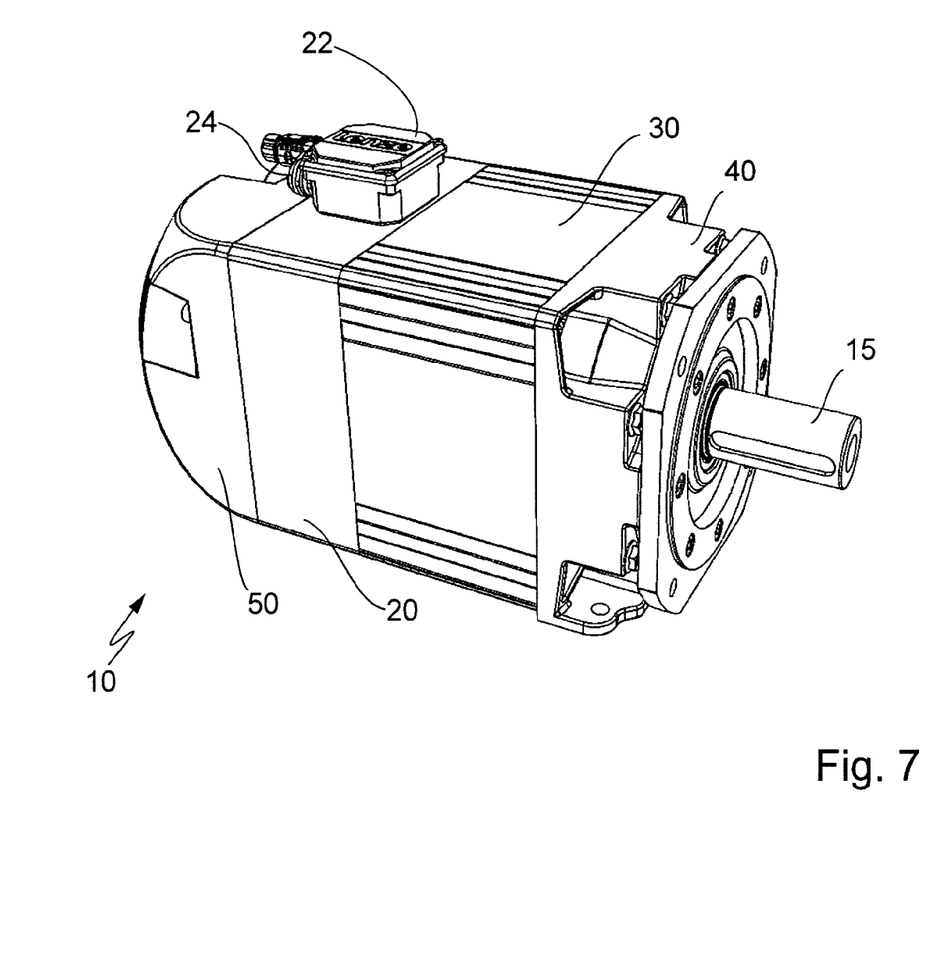
FIG. 7 shows the electric motor from another perspective.

FIG. 7 shows the electric motor 10 in a completely assembled state from a similar perspective as FIG. 6. With respect to the individual illustrated components, reference is made to the above description of the other figures.

Figure 8:
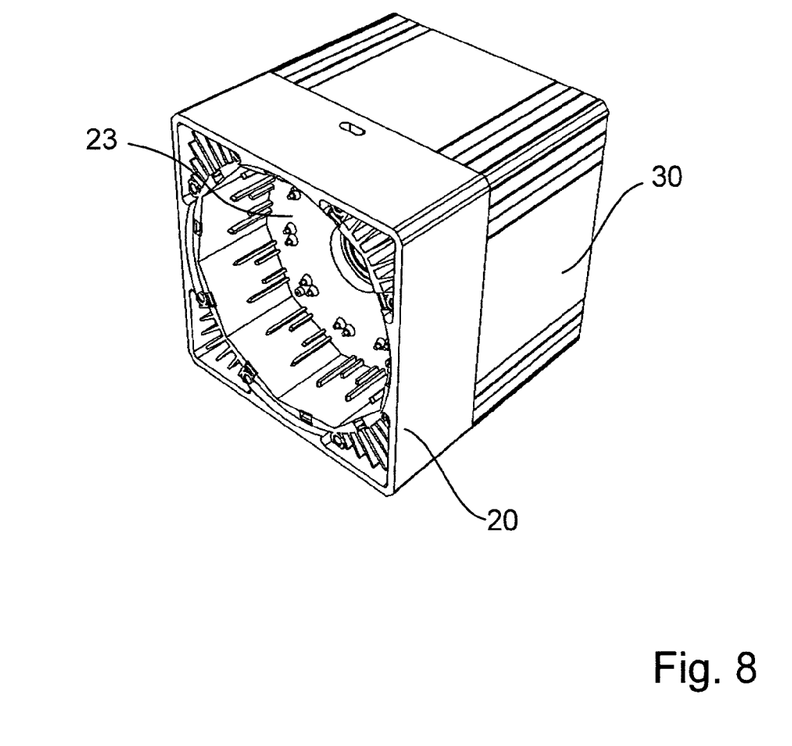
FIG. 8 shows parts of the electric motor.

FIG. 8 shows the non-drive end shield 20 together with the electric motor housing 30. Here, in particular, the non-drive end shield 20 can be seen without a circuit board 100, wherein it is to be mentioned that a cavity 23 for receiving the circuit board 100 is formed in the non-drive end shield 20. Otherwise, reference is made to the description above.

With respect to the electric motor 10 it can also be stated that the non-drive end shield 20 constitutes a housing section which is assigned to the electronics, and the electric motor housing 30 constitutes a housing section which is assigned to the active part.

Figure 9A:
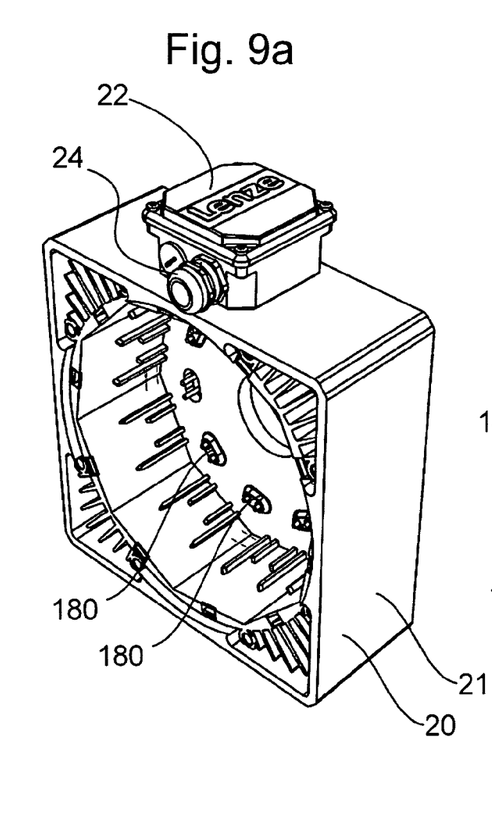
FIG. 9a shows a view of a detail of a non-drive end shield.

FIG. 9*a* shows the non-drive end shield 20 from FIG. 8 in greater detail. It is apparent here, in particular, that in the non-drive end shield 20 or in the housing 21 thereof a total number of ten resilient wire guiding sleeves 180 are arranged. In each case, a wire guiding sleeve 180 is assigned here to a toothed region 120 in the installed state.

The wire guiding sleeves 180 can each be clipped in in a centering, electrically insulating and seal-forming fashion. They can be embodied for this purpose, in particular, from a silicone material or polymer material.

Figure 9B:
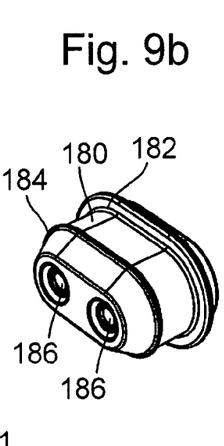
FIGS. 9b and 9c show a latching and sealing lip in different views.
Figure 9C:
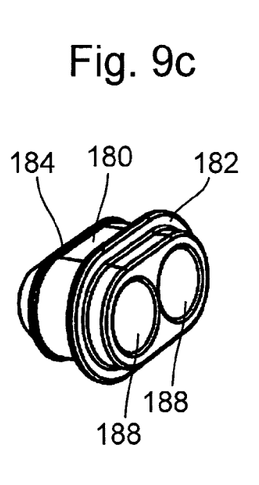

FIGS. 9*b* and 9*c* show a wire guiding sleeve 180 in greater detail. It is apparent here that at each wire guiding sleeve 180 a circulating stop 182 is arranged which cannot be seen in the illustration in FIG. 9*a*, since it is located behind. Furthermore, a wire guiding sleeve 180 has a latching and sealing lip 184 which is located at the front in FIG. 9*a*.

Two drilled holes, which can be seen from the rear as the input 188 and from the front as the output 186 respectively pass through the wire guiding sleeve 180. It is also apparent here that the respective input 188 has a larger diameter than the output 186. The respective drilled holes are therefore embodied in a funnel-shaped way.

If a coil wire enters the respective input 188, in particular if the non-drive end shield 20 is fitted onto the electric motor housing 30 during a mounting process, the already mentioned funnel shape has the effect, in particular, that the coil wires project out at a precisely defined position in the non-drive end shield 20 and can therefore be connected electrically very easily to the circuit board 100.

Figure 10A:
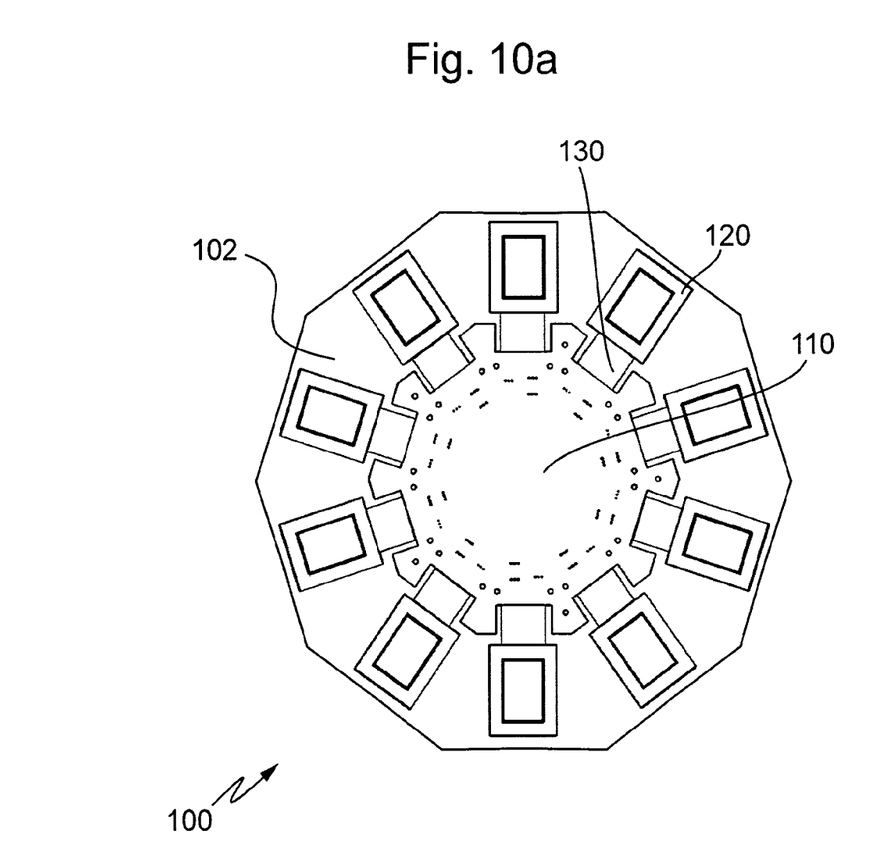
FIG. 10a shows a circuit board with planar toothed regions.

FIG. 10*a* shows a plan view of the circuit board 100 in a state before the respective toothed regions 120 have been folded over. In other words, the toothed regions 120 are aligned flat with the central region 110.

FIG. 10*a* shows, in particular, an output circuit board 102 provided with sections and milled recesses or with segments, with the result that the toothed regions 102 and the central region 110 can be separated. In the state illustrated in FIG. 10*a*, in particular recourse can be made in a particularly advantageous way to normal automated component-placing methods, which significantly reduces the costs compared to manually placing components.

The bending points 130 can be embodied, in particular, as flexible regions. The latter can be produced, for example, monolithically from the base circuit board, for example by milling. Likewise it is possible to attach the bending points 130 as joined-on flexible regions before the contour or the segments are broken up.

As shown, the initial circuit board 102 is embodied in a star shape. In particular it is embodied here as a decagon.

Figure 10B:
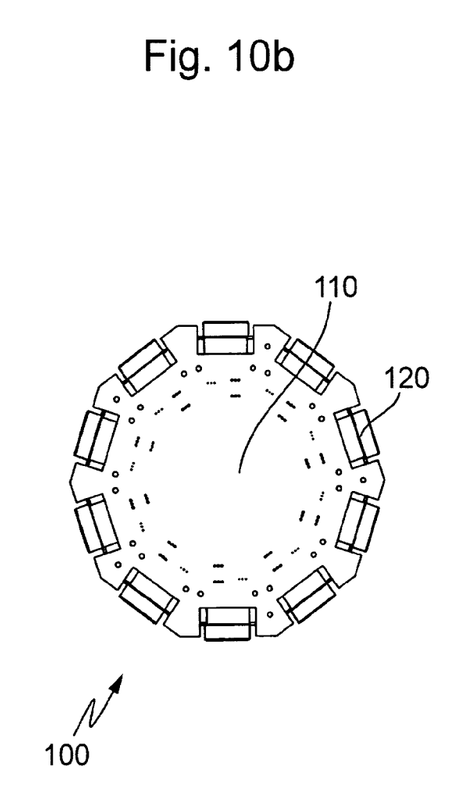
FIG. 10b shows a circuit board with bent toothed regions.

FIG. 10*b* shows the circuit board 100 from FIG. 10*a* in a state in which relevant components have been broken out of the initial circuit board 102, and in addition the toothed regions 120 have been bent through 90°, as is illustrated, for example, in FIG. 1 and the further figures. With respect to the further details, reference is made to the description of the other figures.

What is claimed is:

1. A non-drive end shield for an electric motor, comprising:
   a circuit board on which a converter is formed, integrated into the non-drive end shield, the circuit board divided into a central region and a number of toothed regions surrounding the central region via associated bending points; and
   a housing of the circuit board with a number of inwardly directed cooling fins, wherein
      a respective toothed region of the number of toothed regions is movable, by way of the associated bending point, between an extended state where a plane of the respective toothed region is parallel to a plane of the central region and a bent state where the plane of the respective toothed region is positioned transversely with respect to the plane of the central region;
      the housing has a number of electrically insulating feedthroughs for coil wires, where each feedthrough leads from one side of the housing, which faces the stator coils of the electric motor, to an associated connecting point on the circuit board, and the feedthroughs are embodied in such a way that they taper conically toward the connecting point; and
      the housing is filled with a sealing compound which encloses the circuit board.

2. The non-drive end shield as claimed in claim 1, wherein the planes of the toothed regions in the mounting position are respectively bent in a fixed fashion transversely with respect to the plane of the central region.

3. The non-drive end shield as claimed in claim 1, wherein the central region is electrically coupled to the toothed regions via plug-type connectors.

4. The non-drive end shield as claimed in claim 1, wherein one or both of an intermediate circuit capacitor and a power module are arranged on a respective toothed region.

5. The non-drive end shield as claimed in claim 1, wherein the intermediate circuit capacitor and the power module are arranged at the same position on opposite sides of the respective toothed region.

6. The non-drive end shield as claimed in claim 1, wherein the circuit board is attached to the housing by way of a number of attachment elements.

7. The non-drive end shield as claimed in claim 1, wherein the toothed regions of the circuit board are attached in a heat-conducting fashion to the housing by a respective attachment element.

8. A motor kit, comprising:
an electric motor housing,
a first non-drive end shield as claimed in claim 1, and
a second non-drive end shield which does not have a circuit board with a converter,
wherein both the first non-drive end shield and the second non-drive end shield are combinable with the electric motor housing to form an electric motor in such a way that the electric motor with the first non-drive end shield is from the outside visually identical to the electric motor with the second non-drive end shield.

9. An electric motor, comprising:
an electric motor housing, and
a non-drive end shield which is connected thereto, as claimed in claim 1.

10. The electric motor as claimed in claim 9, wherein
the electric motor has a number of stator coils with respective coil wires, wherein the coil wires are led through respective feedthroughs of the non-drive end shield to corresponding connecting points on the circuit board.

* * * * *